(12) United States Patent
Iwauchi (10) Patent No.: US 8,233,187 B2
(45) Date of Patent: Jul. 31, 2012

(54) PRINTER

(75) Inventor: Nobuyuki Iwauchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 853 days.

(21) Appl. No.: 12/242,509

(22) Filed: Sep. 30, 2008

(65) Prior Publication Data

US 2009/0086218 A1 Apr. 2, 2009

(30) Foreign Application Priority Data

Oct. 2, 2007 (JP) ................................ 2007-259257

(51) Int. Cl.
*G06K 15/02* (2006.01)
*G03G 15/00* (2006.01)
*B41J 29/38* (2006.01)
(52) U.S. Cl. ................ 358/1.2; 399/82; 347/5
(58) Field of Classification Search .................. 358/1.2; 399/82; 347/5
See application file for complete search history.

(56) References Cited

U.S. PATENT DOCUMENTS

2002/0036665 A1* 3/2002 Shima .............................. 347/5
2007/0201893 A1* 8/2007 Yamazaki ....................... 399/82

FOREIGN PATENT DOCUMENTS

| JP | 2000-330908 A | 11/2000 |
| JP | 2003-280836 A | 10/2003 |
| WO | 2005/125173A A1 | 12/2005 |

* cited by examiner

*Primary Examiner* — Charlotte M Baker
*Assistant Examiner* — Justin Katzwhite
(74) *Attorney, Agent, or Firm* — Canon U.S.A., Inc. IP Division (57) ABSTRACT

When performing marginless printing for content data of a size which is the same as the sheet size, white streaks occur in the print result due to a convey error. Further, when object-data items included in the content data are simply magnified, a necessary object-data item may not be printed partly and/or entirely. Therefore, the present invention provides a printer magnifying the object-data items included in the content data appropriately on the printer side. The sheet size described in the content data is compared to the size of a sheet set in the printer and the content data is magnified so that an object-data item such as a text-data item considered as necessary for a user does not extend off the sheet size.

7 Claims, 12 Drawing Sheets

FIG. 2

```
<?xml version="1.0" encoding="UTF-8"?>
<!DOCTYPE html PUBLIC"-//W3C//DTD XHTML-Print 1.0//EN"
    "http://www.w3.org/MarkUp/DTD/xhtml-print10.dtd">
<html xmlns="http://www.w3.org/1999/xhtml">
<head>
<title>Photo Print</title>
<style type="text/css">
@media print{@page{size:210.000mm 297.000mm;margin:0.000mm;}}
body{padding:0mm;}
div.page{position:relative;page-break-after:always;}
div.page_last{position:relative;}
div.img1{overflow:hidden;padding:0mm;position:absolute;
top:0mm;left:0mm;width:210.000mm;height:297.000mm;}
img.img1    { height:297.000mm;  width:210.000mm;  margin-top:0.000mm;
margin-left:0.000mm;
image-orientation:0deg;}
p{   .font-family:sans-serif;  font-size:8pt;  text-align:  right;   color:#ff9900;
white-space:pre;}
p.dt1{position:absolute;left:0mm;width:50.000mm;top:70.000mm;margin:0mm;}
p.dt2{position:absolute;left:0mm;width:50.000mm;top:90.000mm;margin:0mm;}
p.dt3{position:absolute;left:0mm;width:50.000mm;top:110.000mm;margin:0mm;}
p.dt4{position:absolute;left:0mm;width:50.000mm;top:130.000mm;margin:0mm;}
</style>
</head>
<body>
<div class="page_last">
  <div class="img1">
    <img src="background.jpg" class="img1" alt=""/>
    <p class="dt1"> THERE IS CONNECTION BETWEEN CHARACTER AND </p>
    <p class="dt2"> RULE ON BACKGROUND. IF ONLY BACKGROUND IS </p>
    <p class="dt3"> MAGNIFIED, ARRANGED CHARACTER AND RULE ARE </p>
    <p class="dt4"> DISPLACED FROM EACH OTHER. </p>
  </div>
</div>
</body>
</html>
```

MAGNIFIED-IMAGE-OBJECT-MANAGEMENT TABLE

| INDEX NUMBER | OBJECT ID |
|---|---|
| 1 | Image_001 |

MAGNIFIED-BACKGROUND-IMAGE-OBJECT-MANAGEMENT TABLE

| INDEX NUMBER | OBJECT ID |
|---|---|
| 1 | BackGroundImage_001 |

PRINTER

BACKGROUND OF THE INVENTION

1. Field of the Invention

The present invention relates to a printer configured to magnify object data included in marginless-content data in an appropriate manner so that the output result of the marginless-content data includes no white streaks.

2. Description of the Related Art

Usually, when content data written in a markup language (ML) including a hypertext markup language (HTML), etc. is printed, a print result desired by a user is not obtained in many cases. Technologies for solving the above-described problem have been available.

For example, Japanese Patent Laid-Open No. 2000-330908 discloses the technology for performing layout editing based on a print sheet, etc. The above-described technology allows for preventing an image from being lost when data provided to display the HTML, etc. is printed.

Further, Japanese Patent Laid-Open No. 2003-280836 discloses the technology for designating image data for printing, the image data being desired by the user, by making print designation (not for printing/monochrome/color) for each object-data item included in content data.

Incidentally, when image data is printed, the image data is often not printed on the edge of the sheet so that a margin occurs. Therefore, the so-called marginless printing performed to print image data on the edge of the sheet by making image data for printing a little larger than the sheet size have been widely available.

However, it is difficult for the content maker to perceive the printable area of a printer used to perform printing when the content maker is generating HTML-print-content data. Therefore, when generating content data ready for the marginless printing, the value of the margin amount is set to zero and object-data items included in the content data are arranged to the limits of the edges of the sheet so that the marginless printing is achieved. That is to say, content data ready for the marginless printing is generated by arranging image-data items in an area filling the sheet size.

However, even though the marginless-content data is generated in the above-described manner, the white streak occurs at the edge of the sheet due to a convey error such as an oblique feed caused by the printer. Further, when each of object-data items included in the content data is simply magnified, so as to prevent the white-streak occurrence, the object-data items extend off the sheet size so that part of the object-data items is not printed.

SUMMARY OF THE INVENTION

Accordingly, the present invention provides a printer that can print data without outputting a white-streak image and losing part of and/or the entire necessary object data when performing the marginless printing for ordinarily generated content data of a size which is the same as the sheet size.

The present invention provides a printer configured to appropriately magnify an object-data item included in content data on the printer side when the content data is marginless-content data.

According to the present invention, the object-data item included in the content data is appropriately magnified on the printer side. Therefore, when the marginless printing is performed for the content data generated to have the same size as the sheet size, no white-streak image is output and part of and/or the entire necessary object data is not lost.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings.

Figure 1:
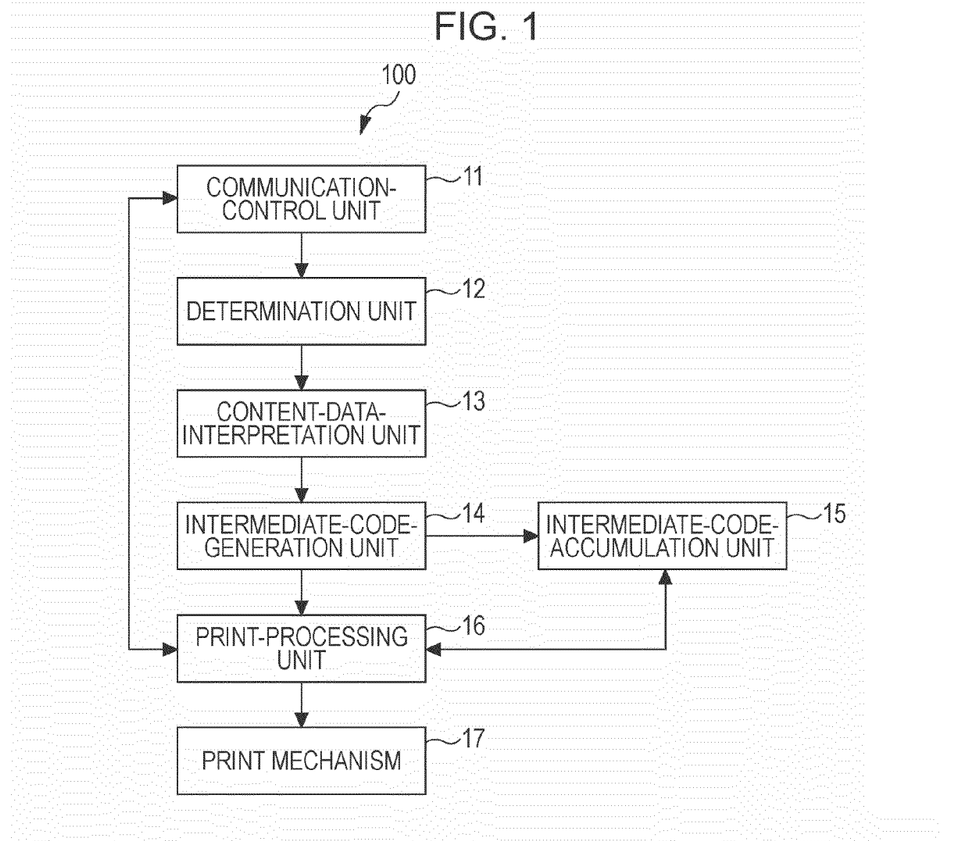
FIG. 1 is a block diagram showing the configuration of a printer 100.

FIG. 1 is a block diagram showing the configuration of a printer 100 according to an embodiment of the present invention. The printer 100 is configured to receive and print content data. Here, the received content data may be of any type as long as the content data is written in a markup language. For example, the received content data may be of any type as long as the content data is a description written in a hypertext markup language (HTML), a portable document format (PDF), scalable vector graphics (SVG), etc. so that the printer 100 can interpret the description.

The printer 100 includes a communication-control unit 11, a determination unit 12, a content-data-interpretation unit 13, an intermediate-code-generation unit 14, an intermediate-code-accumulation unit 15, a print-processing unit 16, and a print mechanism 17.

The communication-control unit 11 controls communications performed between the printer 100 and the outside, such as the Ethernet (registered trademark), and acquires the content data from the outside.

The determination unit 12 determines an interpretation method used to interpret the content data acquired by the communication-control unit 11 based on the type of the content data. For example, the determination unit 12 determines the type of content data transmitted to the printer 100 by using information about the extension of the transmitted content data. More specifically, if the content data is written in the HTML, the determination unit 12 determines the method for interpreting the content data based on an extension referred to as ".html". Further, if the content data is provided as a PDF file, the determination unit 12 determines the method for interpreting the content data based on an extension referred to as ".pdf". Further, the determination unit 12 may determine the type of content data before acquiring the content data based on a print-control command used to communicate with a higher-order device.

The content-data-interpretation unit 13 interprets the content data based on a result of the determination made by the determination unit 12.

The intermediate-code-generation unit 14 generates an intermediate code based on data obtained by the content-data-interpretation unit 13 through interpreting the content data. The above-described "intermediate code" is obtained by encoding information about the type of object data included in the content data, the position where the object data is arranged, the width of the object data, and the height of the object data. Further, if the object data is text-object data, the intermediate code includes encoded font information.

That is to say, the above-described intermediate code is layout information indicating the layout of the object data, that is, the size and/or the position of the object data. The printer 100 can lay out the object data by generating the above-described intermediate code. Further, the intermediate-code-generation unit 14 performs magnification processing for the content data, as will be described later, and generates the intermediate code based on a result of the magnification processing.

The intermediate-code-accumulation unit 15 accumulates the intermediate code generated by the intermediate-code-generation unit 14.

The print-processing unit 16 converts image data including arranged object-data items into print data based on the intermediate data accumulated in the intermediate-code-accumulation unit 15, and transmits the print data to the print mechanism 17. Here, the print data is transmitted to the print mechanism 17 at intervals of a single band so that the print mechanism 17 can process the print data, where the sheet size is determined to be the band width and n pixels are determined to be the band height.

Figure 2:
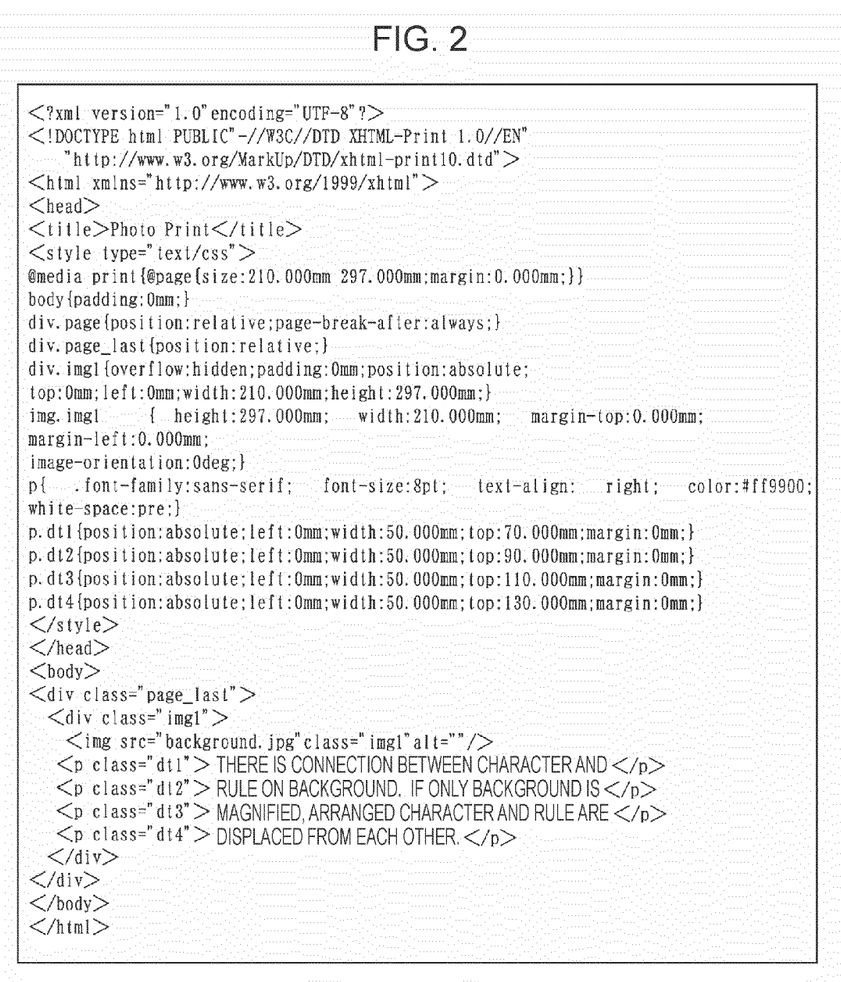
FIG. 2 shows the details on content data described in an HTML-Print.

FIG. 2 shows the details of content data described in an HTML-Print.

The printer 100 determines whether or not the content data is ready for marginless printing by using @media information described in the content data. Here, @page data is described, as the @media information. The @page data shows that the content data can be arranged on the entire area of the sheet size (the width is 210 mm and the height is 297 mm, which corresponds to the A4 size) when the margin is determined to be 0.000 mm in the printer 100.

The intermediate-code-generation unit 14 can recognize the position where the object data is laid out by analyzing the content data shown in FIG. 2, for example. Further, if data on a background image is specified on a style sheet in the HTML-Print description shown in FIG. 2, for example, the intermediate-code-generation unit 14 processes the background-image data, as background-image-object data.

Further, the size of the entire content data can be recognized based on the position of each of the upper-left end and the lower-right end of the background-image-object data.

Each of FIGS. 3A, 3B, 3C, and 3D shows the relationship between the content data and the sheet size.

Figure 3A:
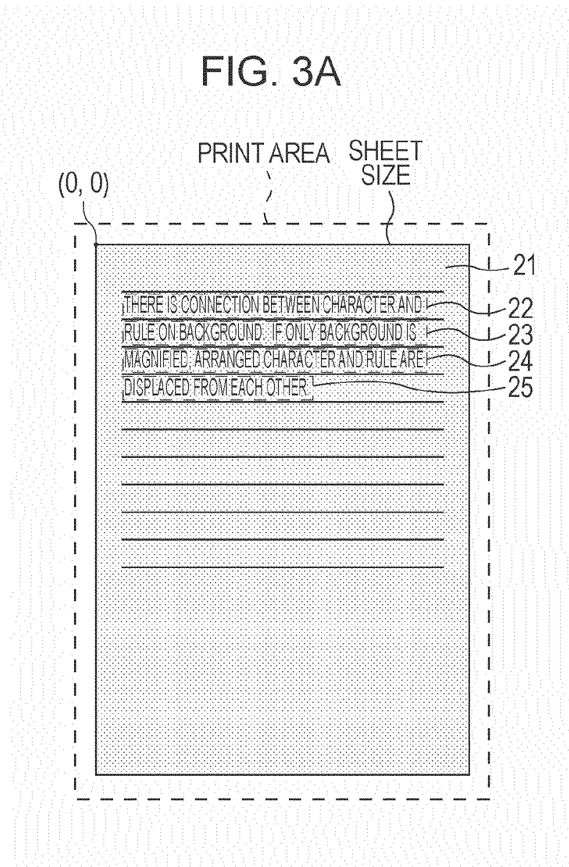
FIG. 3A shows the relationship between the content data and the sheet size.
Figure 3B:
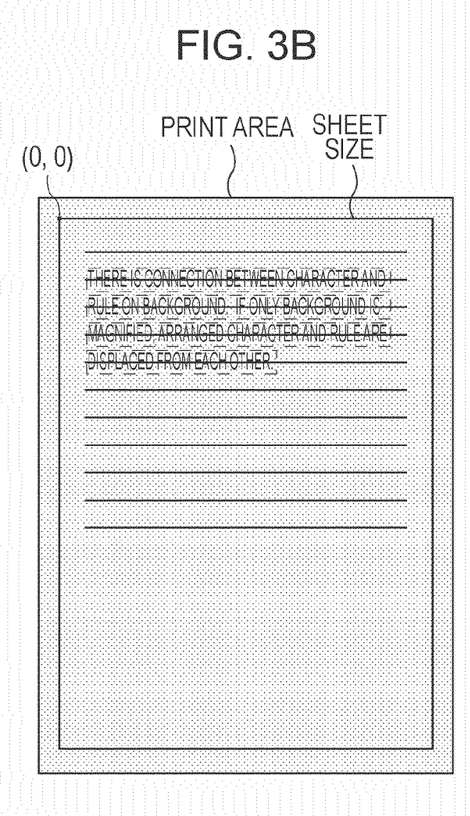
FIG. 3B also shows the relationship between the content data and the sheet size.

According to an example shown in FIG. 3A, background-image-object data 21 is arranged so that the size of an A4 sheet is filled therewith, which makes it possible to achieve the marginless printing.

Further, when the upper-left end of the sheet shown in FIG. 3A is determined to be the start point (0, 0), text-object data 22 is arranged in a 50-mm wide and 70-mm tall area provided in a predetermined position. Each of text-object data 23, text-object data 24, and text-object data 25 is also arranged in a specified position in the above-described manner.

Further, the intermediate-code-generation unit 14 can determine whether the value of the sheet-size specification described in the content data is the same as the size of a sheet actually set in the printer 100. Therefore, the size of a sheet on which a drawing is shown denotes the size of the sheet actually set in the printer 100. Here, the sheet size may be acquired by a size-acquisition unit (not shown) that can detect the size of a sheet set in the printer 100 through a sensor, or through the sheet-size settings made by a user.

For example, when the size of an output of the content data agrees with the sheet size, as in the example where each of the size of an output of the content data and that of a sheet set in the printer 100 is A4, the output result becomes, as is the case with FIG. 3A. However, if a small convey error such as an oblique feed occurs, white streaks occur at the edges of the sheet, as shown in FIG. 3D.

Figure 3C:
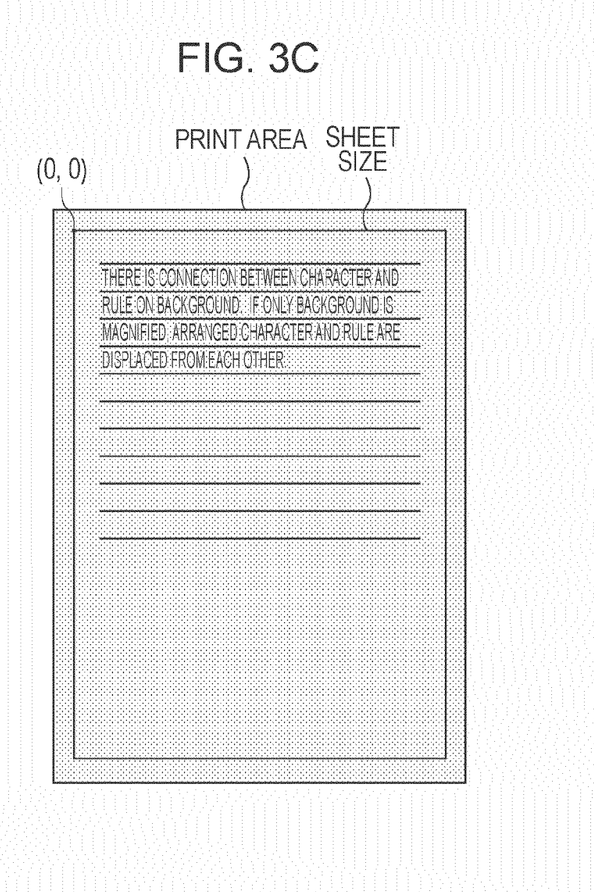
FIG. 3C also shows the relationship between the content data and the sheet size.
Figure 3D:
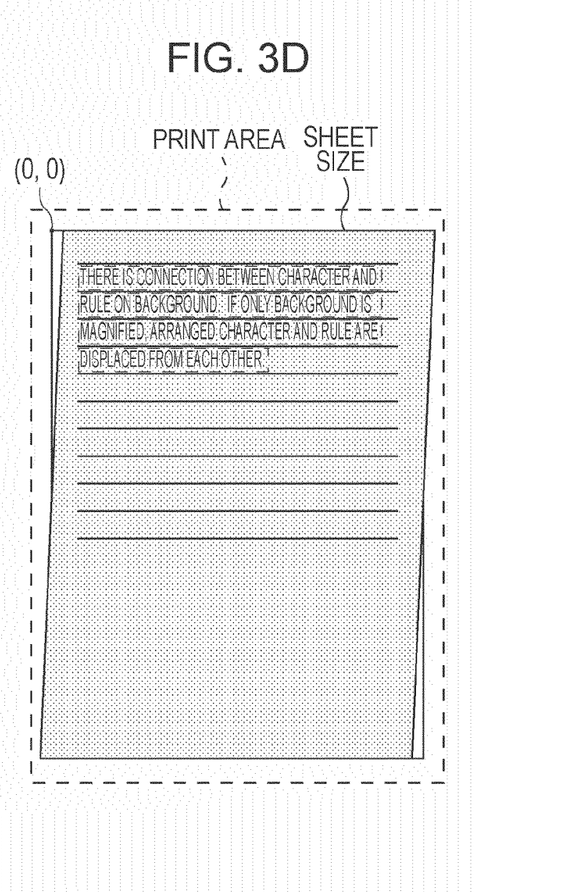
FIG. 3D also shows the relationship between the content data and the sheet size.

Usually, for avoiding the occurrence of the white streaks, all of the background-image-object data 21, the text-object data 22, the text-object data 23, the text-object data 24, and the text-object data 25 that are included in the content data are magnified to the limits of printable areas, as shown in FIG. 3C. Consequently, the marginless printing is achieved while reducing the white streaks occurring at the edges of the sheet due to the convey error. However, the above-described magnification is often inappropriate depending on the details of the content data.

Figure 4A:
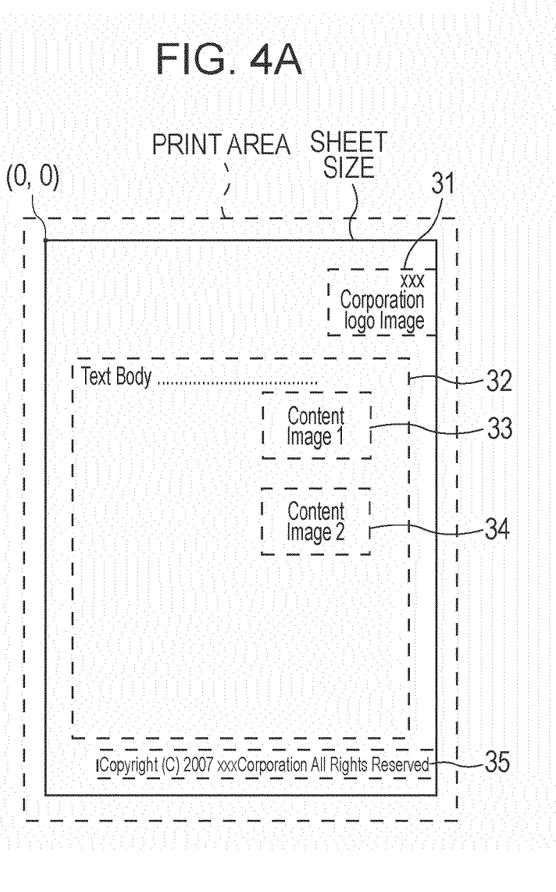
FIG. 4A shows an example inappropriate magnification of the content data.
Figure 4B:
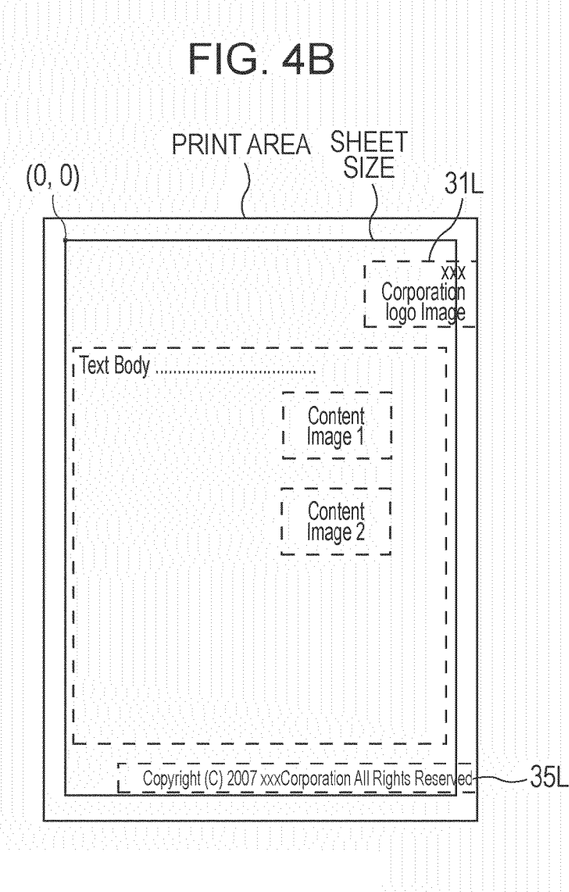
FIG. 4B shows another example inappropriate magnification of the content data.

Each of FIGS. 4A and 4B shows an example inappropriate magnification of content data.

According to the content data shown in FIG. 4A, text-object data 31, text-object data 32, image-object data 33, and image-object data 34 that are provided to show the logo of a corporation, etc., and text-object data 35 provided to show the trademark of the corporation, etc. are arranged in positions shown in FIG. 4A. FIG. 4B shows the result of printing performed when the entire content data is magnified.

The text-object data 31 and the text-object data 35 that are arranged at the edges of the sheet size, as shown in FIG. 4A, are arranged, as is the case with text-object data 31L and text-object data 35L, respectively, as shown in FIG. 4B. In that case, the above-described text-object data 31L and text-object data 35L extend off the sheet size, so that information about the content data is partly and/or entirely lost.

In the above-described embodiment, therefore, the intermediate-code-generation unit 14 of the printer 100 determines whether or not the object data is permitted to extend off the sheet size. Then, the intermediate-code-generation unit 14 determines whether or not the magnification processing should be performed based on the determination result.

Further, in the above-described embodiment, when the content data is magnified to perform the marginless printing, the background-image-object data and the image-object data may (are permitted to) extend off the sheet size. Further, the print result is significantly affected when text-object data, table-object data showing the box of a table, delimiting-object data showing a delimiting line, form-object data showing the box where text data is input, etc. extend off a sheet. Therefore, any object other than the background-image-object data and the image-object data is not permitted to extend off the sheet.

Thus, when generating the intermediate code, the intermediate-code-generation unit 14 determines whether or not the magnification processing should be performed. Consequently, marginless printing desired by the user can be performed.

Figure 5:
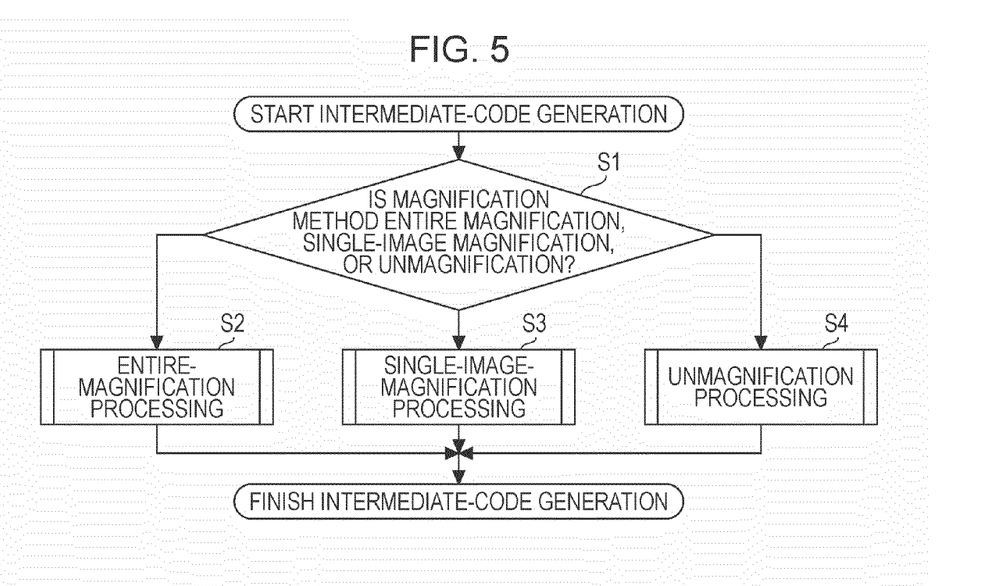
FIG. 5 is a main flowchart showing processing procedures performed to generate an intermediate code.

FIG. 5 is a main flowchart showing processing procedures performed to generate the intermediate code according to the above-described embodiment. The flowchart illustrates the above-described magnification-processing determination.

First, at step S1, the magnification method is confirmed with the user, so as to generate the intermediate code. The magnification method includes entire-magnification processing, single-image-magnification processing, and unmagnification processing.

The above-described "entire-magnification processing" is the method of magnifying the entire object data according to a print area. Further, the above-described "single-image-magnification processing" is the method of magnifying each of image-object data and background-image-object data in the case where a single image-object-data item and a single background-image-object-data item are included in the content data. The above-described "unmagnification processing" denotes that no object data is magnified.

After the user selects one of the entire-magnification processing, the single-image-magnification processing, and the unmagnification processing by using an operation unit (not shown) provided on the printer 100, at step S1, the selected magnification method is set. Further, the user may select the magnification method not only by using the operation unit provided on the printer, but also by changing settings made for the printer 100 from an external-connection device via a universal serial bus (USB) and/or a network.

Then, one of the entire-magnification processing performed at step S2, the single-image-magnification processing performed at step S3, and the unmagnification processing performed at step S4 is executed, the one being selected based on the magnification determination made at step S1.

Figure 6:
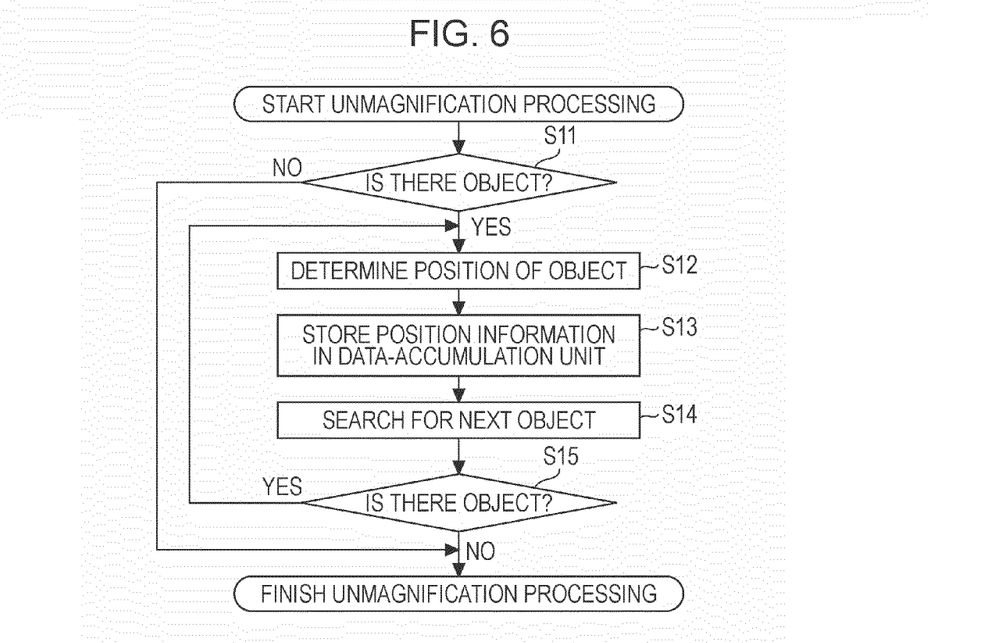
FIG. 6 is a main flowchart showing details on unmagnification processing.

FIG. 6 is a main flowchart showing the details of the unmagnification processing performed at step S4 shown in FIG. 5. This processing is performed, for example, when the user does not wish to perform the marginless printing and magnify the content data.

After interpreting the content data at step S11, it is checked whether or not object data constituting an intermediate code exists. If the object data exists, the processing advances to step S12. At step S12, the position of the object data, the position being determined with reference to the sheet size, and the width and the height of the object data are determined. After that, at step S13, information about the position of the object data, the position being determined at step S12, is stored in the intermediate-code-accumulation unit 15. Then, a search for the next object data is made at step S14. If a result of the above-described search made at step S14 shows that the object data exists at step S15, the processing returns to step S12. If it is determined that the next object data does not exist at step S15, it is determined that the position of each object data is confirmed, so that the unmagnification processing is finished and the intermediate-code-generation processing is finished. In that case, data on an image shown in FIG. 3A, for example, is transmitted to the print mechanism 17.

Figure 7:
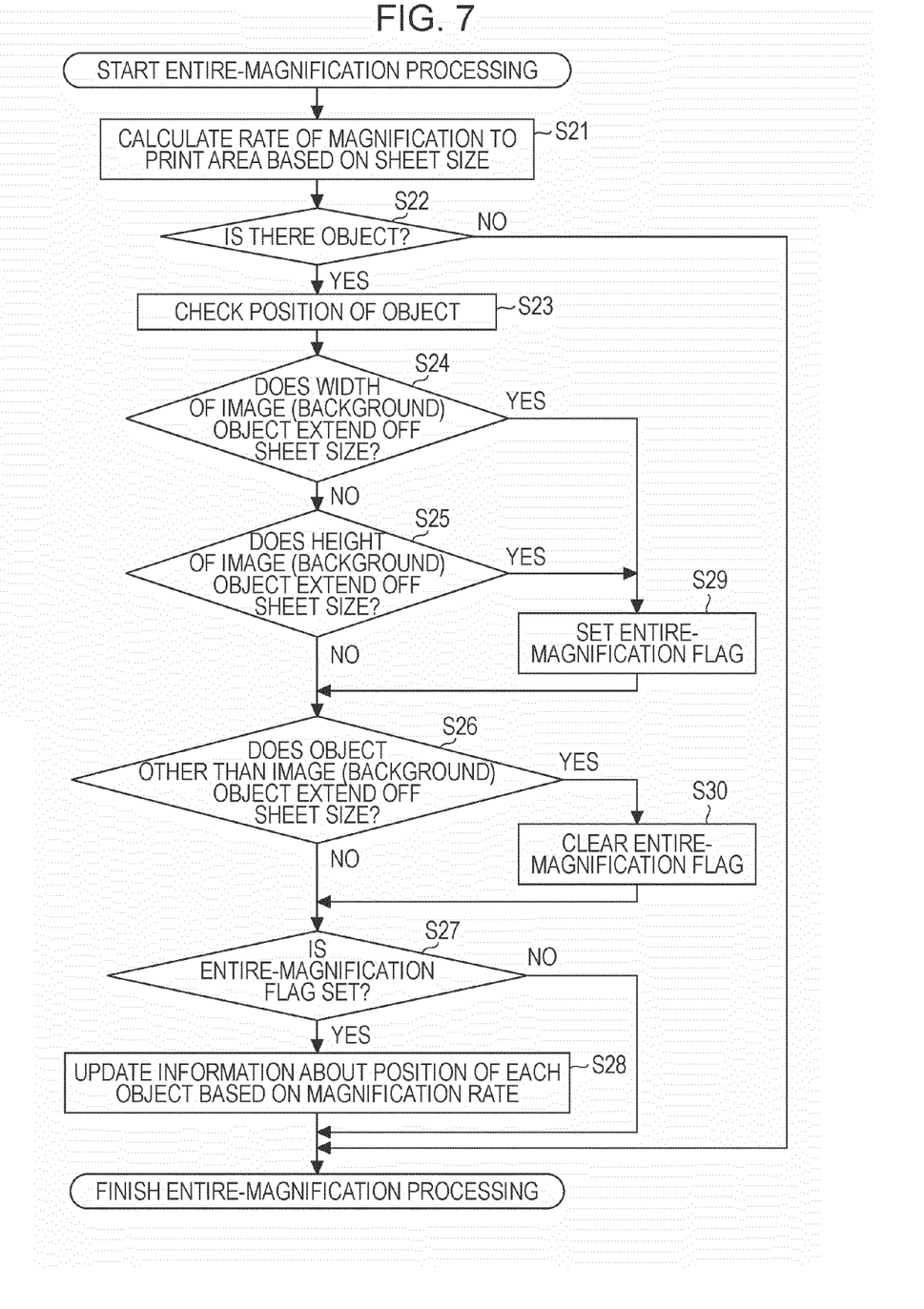
FIG. 7 is a flowchart showing operations performed to achieve entire-magnification processing.

FIG. 7 is a flowchart showing details of the entire-magnification processing performed at step S2, as shown in FIG. 5.

The above-described processing is performed, for example, when the user wishes to perform the marginless printing and reduce the white streaks occurring due to the convey error. The above-described processing is particularly effective when the background image alone is magnified, which compromises the position relationship between the object-data items, as is the case with FIG. 3B.

Hereinafter, the coordinates of an origin point determined with reference to the sheet size correspond to the upper left end of the sheet size. The inequality X>0 holds for the area shown on the right of the position of the origin point and the inequality Y>0 holds for the area shown under the origin-point position.

First, at step S21, the size (the width and the height) of the sheet is compared to the size (the width and the height) of a print area on which data is stored in an internal storage device provided in the printer 100 based on the @page information showing the details of the content data, as shown in FIG. 2, and the magnification rate is calculated. Then, at step S22, a search for object data is made by referring to a result of the interpretation achieved by the content-data-interpretation unit 13. If the object data exists, the processing advances to step S23 where the width, the height, and the arrangement position of each object data included in the content data are checked.

Next, at step S24, it is determined whether or not the width of the background-image-object data and/or the image-object data extends off the sheet size based on the result of the checking performed at step S23. Namely, if there is any background-image-object data or image-object data, where the value of the X coordinate of the upper-left end of the object data is 0 or less and that of the X coordinate of the lower-right end of the object data is at least equivalent to the breadth of the sheet size, it is determined that the object data extends off the sheet size and the processing advances to step S29. Otherwise, the processing advances to step S25. At step S25, it is determined whether or not the height of the background-image-object data and/or the image-object data extends off the sheet size based on the result of the checking performed at step S23. More specifically, if there is any background-image-object data or image-object data, where the value of the Y coordinate determined on the upper-left end of the object data is 0 or less and that of the Y coordinate determined on the lower-right end of the object data is at least equivalent to the height of the sheet size, it is determined that the object data exceeds the height of the sheet size and the processing advances to step S29. Otherwise, the processing advances to step S26. The above-described determinations made at steps S24 and S25 can prevent the content data which is originally smaller than the sheet size from being unnecessarily magnified.

If the processing advances to step S29 due to the results of the above-described determinations made at steps S24 and S25, an entire-magnification flag is set.

On the other hand, at step S26, the position of object data other than the background-image-object data and the image-object data is calculated, the position being determined when the entire-magnification processing is performed based on the magnification rate calculated at step S21, and it is determined whether or not the object data extends off the sheet size. If the result of the determination made at step S26 shows that the object data extends off the sheet size, the entire-magnification flag is cleared at step S30 so that the entire-magnification processing is not performed.

At step S27, it is confirmed whether or not the entire-magnification flag is set. If the entire-magnification flag is set, the processing advances to step S28 where information about the position of each object data is updated to information about a position determined after the entire-magnification processing is performed based on the magnification rate calculated at step S21.

According to the above-described flowchart, the entire-magnification processing is not performed if it is determined that necessary object data, etc. shall be partly and/or entirely lost due to the entire-magnification processing. Therefore, it becomes possible to prevent necessary object data from being partly and/or entirely lost, the object data being arranged to the limits of the ends of the sheet size. For example, each of the text-object data 31 and the text-object data 35 that are shown on the content data shown in FIG. 4A extends off the sheet size due to the entire-magnification processing, whereby text information is partly and/or entirely lost. However, it becomes possible to avoid the above-described problem by performing the processing procedures shown in the above-described flowchart.

On the contrary, in the case where the content data shown in FIG. 3A is provided, it can be determined that each of the text-object-data items 22, 23, 24, and 25 does not extend off the sheet size even after the entire-magnification processing is performed. Further, it can be determined that the text-object data does not extend off the sheet size. In that case, therefore, the entire-magnification processing is performed and the image data shown in FIG. 3C is obtained, as a result of the processing.

Accordingly, the marginless printing can be achieved while preventing necessary object data from being extended off the sheet size, the necessary object data being arranged to the limits of the ends of the sheet size.

According to the flowchart shown in FIG. 7, first, the position of each arranged object data included in the content data is checked, and it is checked whether necessary object data and/or object data that may be partly and/or entirely lost extends off the sheet size. However, without being limited to the above-described processing procedures, the processing performed to determine whether or not the object data extends off the sheet size and of what type the object data is may be performed repeatedly so that the above-described processing is performed for each object data.

Although each existing object data is magnified in FIG. 7, only the background-image-object data may be magnified, which is effective when necessary object data extends off the sheet size due to the entire-magnification processing.

FIGS. 8A, 8B, 8C, 8D, 8E, and 8F are provided to show a magnification-determination-area unit when the single-image-magnification processing is performed at step S3 shown in FIG. 5 and example outputs of the content data.

Figure 8A:
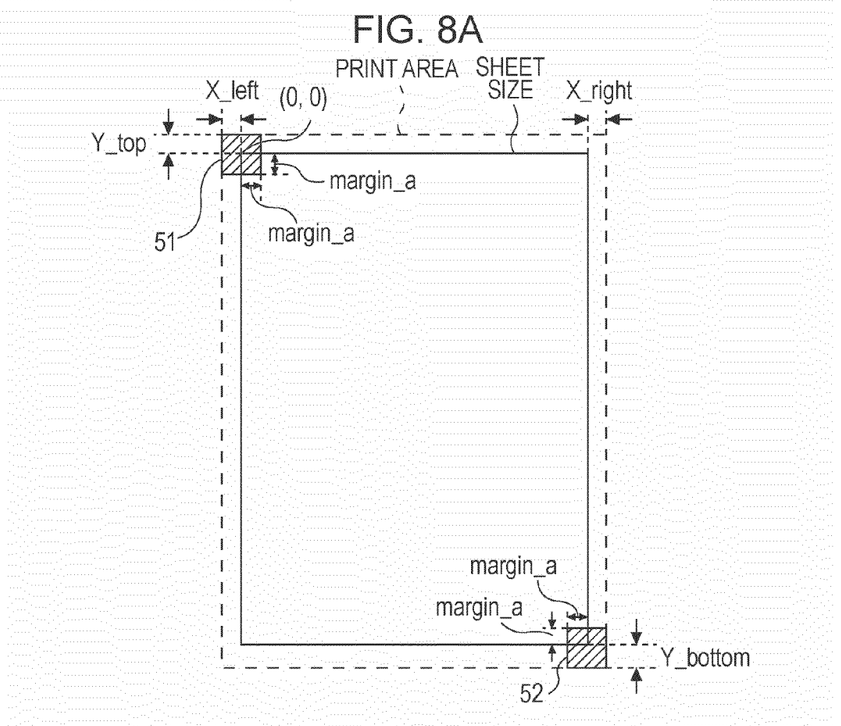
FIG. 8A shows an example output of the image of a magnification-determination-area unit and the content data when single-image-magnification processing is performed.
Figure 8B:
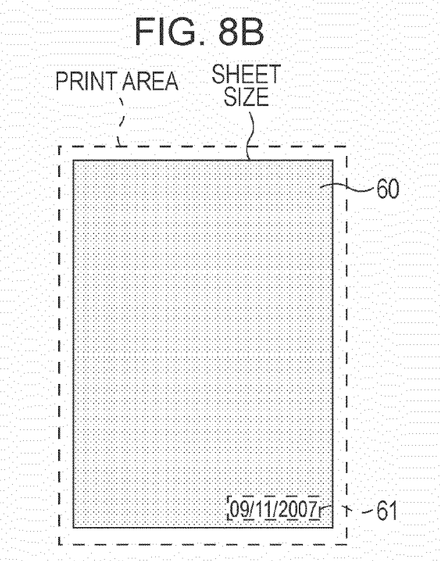
FIG. 8B shows another example output of the image of the magnification-determination-area unit and the content data when the single-image-magnification processing is performed.
Figure 8C:
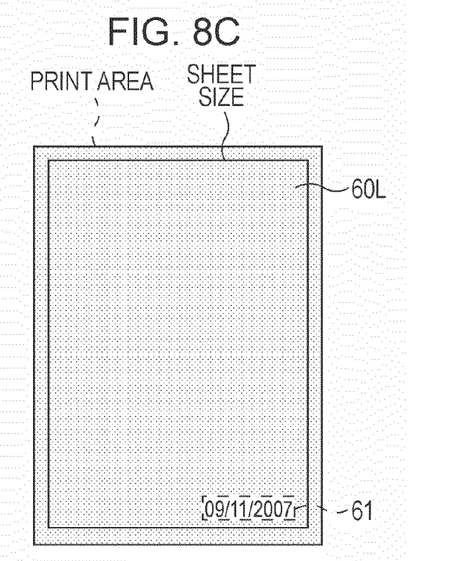
FIG. 8C shows another example output of the image of the magnification-determination-area unit and the content data when the single-image-magnification processing is performed.

The content data shown in FIG. 8B includes a single image-object-data item 60 and a single text-object-data item 61.

According to FIG. 8B, only the image-object-data item 60 is magnified so that a magnified image-object-data item 60L is obtained. The text-object-data item 61 is not magnified, and shown in its original form with the magnified image-object-data item 60L. Consequently, the output result shown in FIG. 8C can be obtained.

Figure 8D:
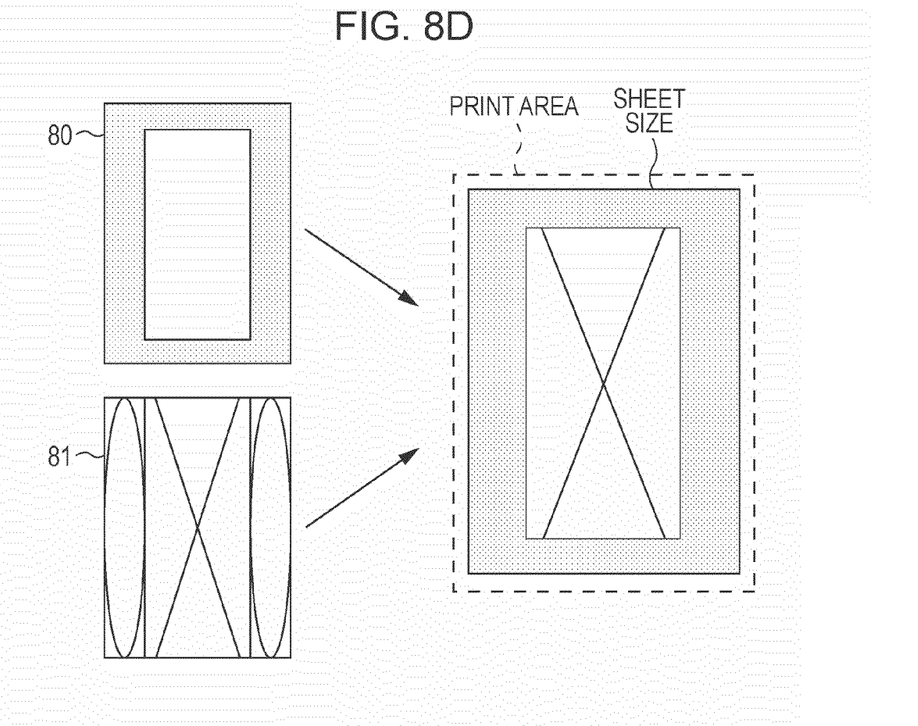
FIG. 8D shows another example output of the image of the magnification-determination-area unit and the content data when the single-image-magnification processing is performed.
Figure 8E:
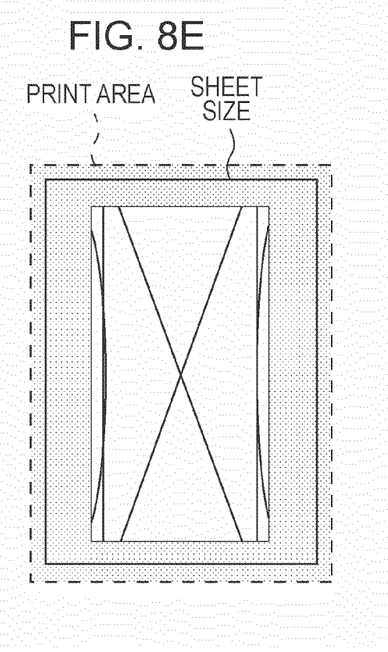
FIG. 8E shows another example output of the image of the magnification-determination-area unit and the content data when the single-image-magnification processing is performed.
Figure 8F:
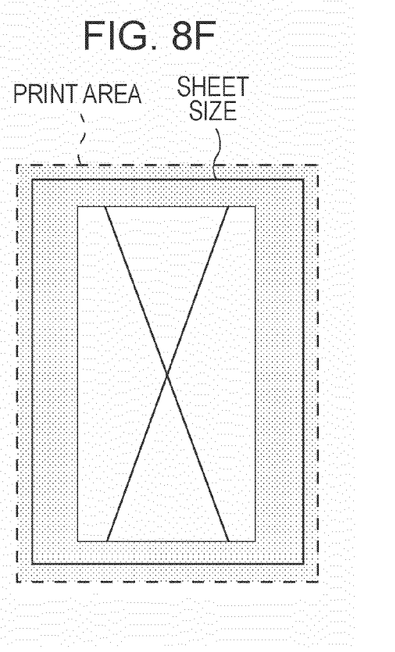
FIG. 8F shows another example output of the image of the magnification-determination-area unit and the content data when the single-image-magnification processing is performed.

Further, the content data shown in FIG. 8D includes a single image-object-data item 80 and a single background-image-object-data item 81. In that case, if the image-object-data item 80 alone is magnified, an area in which the background-image-object-data item 81 is shown is changed, as shown in FIG. 8E. In that case, the style in which the content data is shown in the output result becomes different from that which was originally intended. Therefore, both the image-object-data item 80 and the background-image-object-data item 81 are magnified so that the magnification processing is performed and the marginless printing is achieved while a display area specifically designed for the content data is maintained.

Figures 9, 9A:
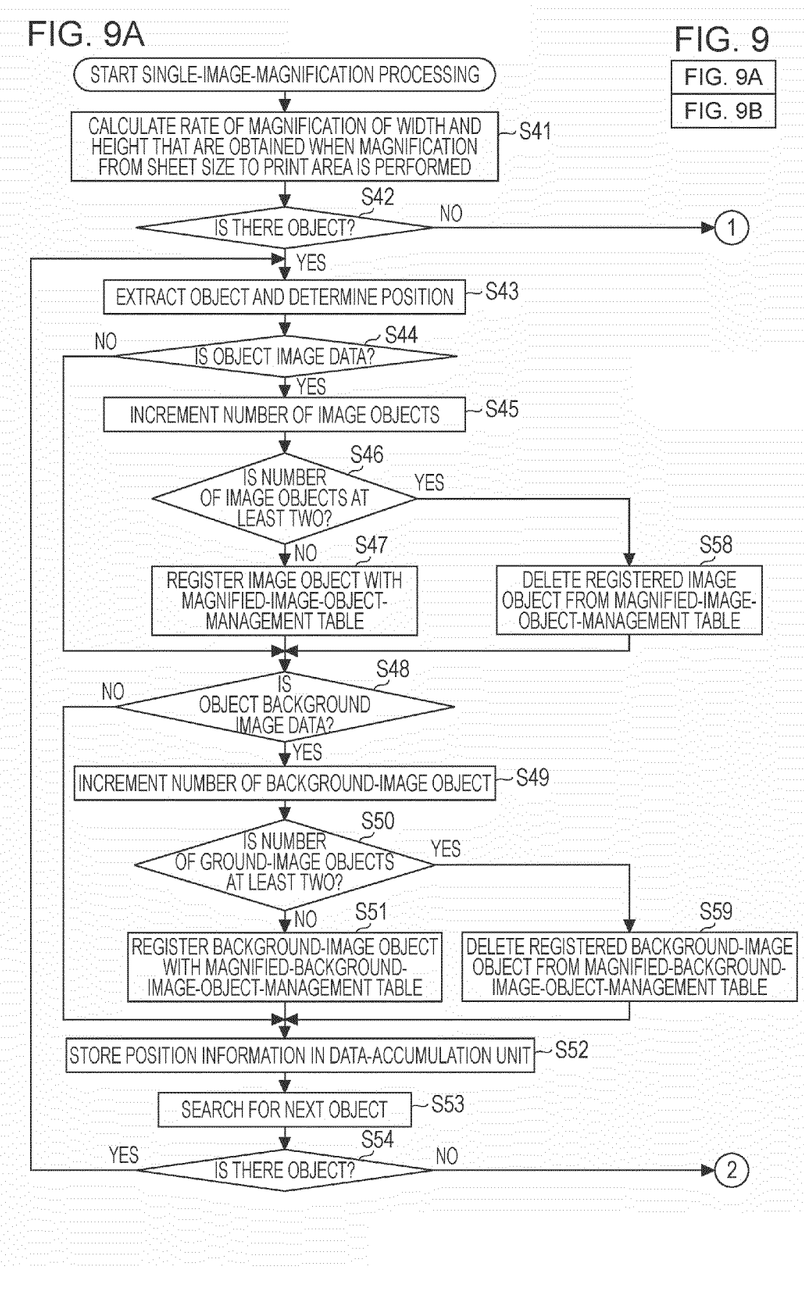
FIG. 9A is a flowchart showing the single-image-magnification processing.
Figure 9B:
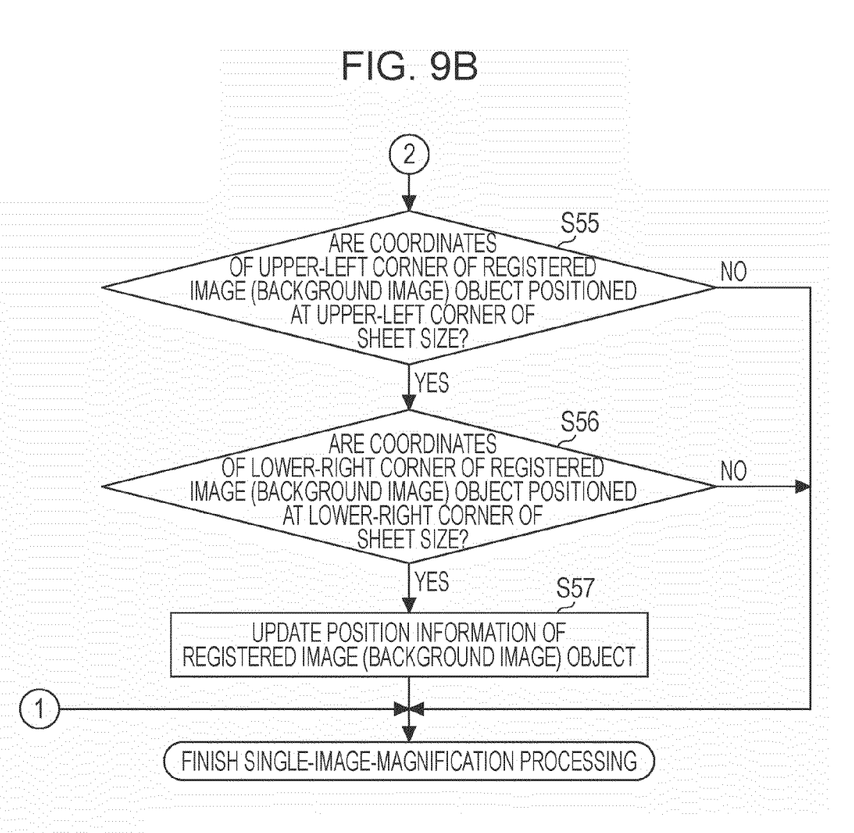
FIG. 9B is another flowchart showing the single-image-magnification processing.

Next, details on the single-image-magnification processing illustrated in FIGS. 8A to 8F will be described. Each of FIGS. 9A and 9B is a flowchart showing the single-image-magnification processing performed at step S3. According to the above-described embodiment, the magnification processing is not performed when there are at least two image-object-data items and at least two background-image-object-data items. This is because the object-data items often overlap one another due to the magnification processing performed when there are the at least two image-object-data items and the at least two background-image-object-data items.

First, at step S41, the size (the width and the height) of the sheet is compared to the size (the width and the height) of a print area on which data is stored in the internal storage device provided in the printer 100 based on the @page information showing the details on the content data, as shown in FIG. 2, and the magnification rate is calculated. Then, at step S42, a search for an object-data item is made by referring to a result of the interpretation achieved by the content-data-interpretation unit 13. If the object-data item exists, the processing advances to step S43 where a single object-data item included in the content data is extracted, and the position, the width, and the height of an area in which the object-data item is arranged are determined.

Next, at step S44, it is determined whether or not the object-data item extracted at step S43 is image data by referring to the result of interpretation of img-tag information included in the content data shown in FIG. 2, the interpretation being performed by the content-data-interpretation unit 13. If the object-data item is determined to be the image data, the number of the image-object-data item is incremented, at step S45.

Figure 10:
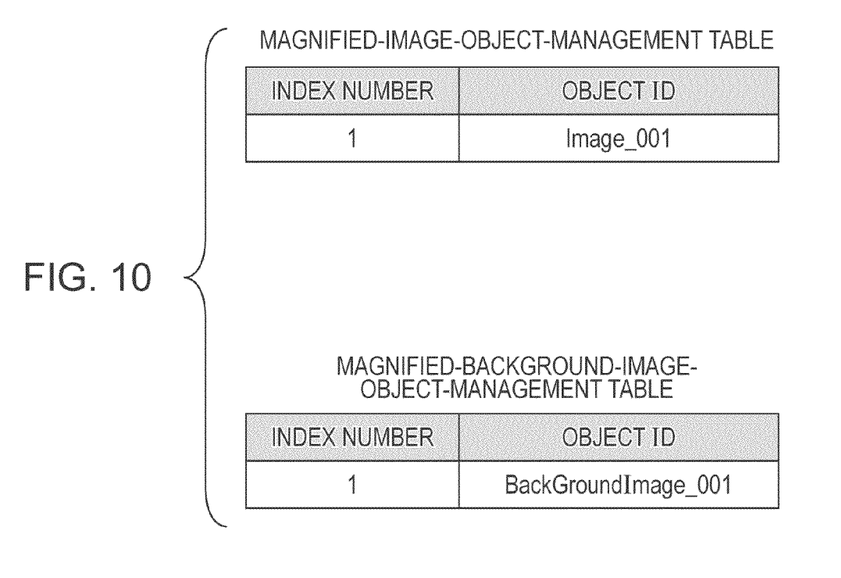
FIG. 10 shows a magnified-image-object-management table.

FIG. 10 shows a magnified-background-image-object-management table.

At step S46, the number of image-object-data items included in the sheet size is counted. If a single image-object-data item is included in the sheet size at step S46, image-object information is registered with the magnified-background-image-object-management table shown in FIG. 10 at step S47.

The image-object information for registration may be an ID number used to identify an object-data item, for example. If it is determined that at least two image-object-data items are included in the sheet size at step S46, the registered image-object information is deleted from the magnified-background-image-object-management table shown in FIG. 10 at step S58, so as to cancel the magnification processing.

At step S48, it is determined whether or not the object-data item extracted at step S43 is a background-image-data item, as is the case with step S44. If the object-data item is determined to be the background-image-data item, the number of background-image-object-data items is incremented at step S49. If it is determined that the background-image-object number is one at step S50, background-image-object information is registered with the magnified-background-image-object-management table shown in FIG. 10 at step S51.

If it is determined that there are at least two image-object-data items at step S50, the registered image-object information is deleted from the magnified-background-image-object-management table shown in FIG. 10 at step S59, so as to cancel the magnification processing.

After that, at step S52, information about the positions of the object-data items is stored in the intermediate-code-accumulation unit 15, and a search for the next object-data item is made at step S53. Then, it is checked whether or not the next-object-data item exists at step S54. If the next-object-data item exists, the processing returns to step S43 and the above-described processing procedures are performed.

After the information about the position of each object-data item is confirmed at step S54, it is determined at step S55 whether the position of the coordinates of the upper-left corner of each of the registered image-object-data item and the background-image-object-data item falls within an oblique-line area 51 provided on the upper-left corner shown in FIG. 8A. If the answer to the above-described determination is yes, it is determined at step S56 whether the position of the coordinates of the lower-right corner of each of the image-object-data item registered at step S47 and the background-image-object-data item registered at step S51 falls within an oblique-line area 52 provided on the lower-right corner shown in FIG. 8A. If the answer to the above-described determination is yes, it is determined that the image-object-data item and the background-image-object-data item of the content data are arranged so that the sheet size is filled therewith. Then, at step S57, the information about the position of each of the registered image-object-data item and the registered background-image-object-data item is updated and the object-data items are magnified so that the printable area is filled therewith.

The signs "X_Left", "Y_Top", "X_Right", and "Y_Bottom" that are shown in FIG. 8A denote the amounts of "extend-off" observed in up-and-down and right-and-left directions when the printer 100 performs marginless processing. The sign "margin_a" denotes the amount of a margin provided to avoid the situation in which the marginless magnification is not performed due to a calculation error occurring when the intermediate code is generated.

According to the above-described embodiment, the margin designation is provided for the content data. However, even though the margin designation is not provided, the marginless magnification can be used in the case where the default margin setting of the style sheet of the printer 100 is 0 mm, as is the case with the above-described embodiment.

Further, in the above-described embodiment, the magnification method is changed from one to another by determining whether the magnification method selected by the user is appropriate. However, without being limited to the above-described configuration, the magnification method can be automatically changed based on the result of the content-data interpretation.

According to the above-described embodiments, the printer performs the magnification processing for the content data, so as to perform the marginless printing for the content data. Consequently, a content-data maker may not recognize the printable area of the printer and prepare content data designed for the marginless printing. Further, it becomes possible to prevent necessary object data such as text-object data from being partly and/or entirely lost even though the magnification processing is performed.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-259257 filed on Oct. 2, 2007, which is hereby incorporated by reference herein in its entirety.

What is claimed is:

1. A printing control apparatus which can cause a printer to print, on a print medium, an image having a print area which is larger than the print medium, the printing control apparatus comprising:
    an acquisition unit configured to acquire a plurality of objects;
    an arranging unit configured to arrange the plurality of objects acquired by the acquisition unit in a print area which is larger than a print medium to be used by a printer, by changing a size of each of the plurality of objects according to a size of the print area;
    a specifying unit configured to specify, from among the plurality of objects, an object of which the arrangement going beyond an area of the print medium is restricted;
    a determination unit configured to determine whether, in a case where the plurality of objects are arranged in the print area by the arranging unit, the object specified by the specifying unit goes beyond the area of the print medium by the arranging unit changing a size of the object; and
    a restriction unit configured to restrict, in a case where it is determined by the determination unit that the object goes beyond the area of the print medium, a printing of an image in which the object goes beyond the area of the print medium by changing a size of the object.

2. The printing control apparatus according to claim 1, wherein the restriction unit restricts the printing of the image in which the object goes beyond the area of the print medium, so that the printer does not perform the printing of the print area.

3. The printing control apparatus according to claim 1, wherein the restriction unit restricts the printing of the image in which the object specified by the specifying unit goes beyond the area of the print medium, so that the printer performs a printing of an image in which the object does not go beyond the area of the print medium and another object goes beyond the area of the print medium.

4. The print control apparatus according to claim 1, wherein the specifying unit specifies an object which includes any one of a text-object-data item, a table-object-data item, and a form-object-data item as the object of which the arrangement going beyond an area of the print medium is restricted.

5. The print control apparatus according to claim 3, wherein the specifying unit excepts an object which includes an image-object-data item and/or a background-image-object-data item from the object of which the arrangement going beyond an area of the print medium is restricted.

6. The print control apparatus according to claim 3, wherein the restriction unit restricts a changing of the size of the object.

7. A printing control method which can cause a printer to print, on a print medium, an image having a print area which is larger than the print medium, the printing control method comprising:
- acquiring a plurality of objects;
- arranging the acquired plurality of objects in a print area which is larger than a print medium to be used by a printer, by changing a size of each of the plurality of objects according to the size of the print area;
- specifying, from among the acquired plurality of objects, an object of which the arrangement going beyond an area of the print medium is restricted;
- determining whether, in a case where the plurality of objects are arranged in the print area by changing a size of each of the plurality of objects according to a size of the print area, the specified object goes beyond an area of the print medium by changing a size of the object; and
- in a case where it is determined the specified object goes beyond the area of the print medium, restricting a printing of an image in which the specified object goes beyond the area of the print medium by changing the size of the object.

* * * * *